March 5, 1957  F. B. JENNINGS  2,783,577
FISH LURE
Filed Dec. 7, 1955
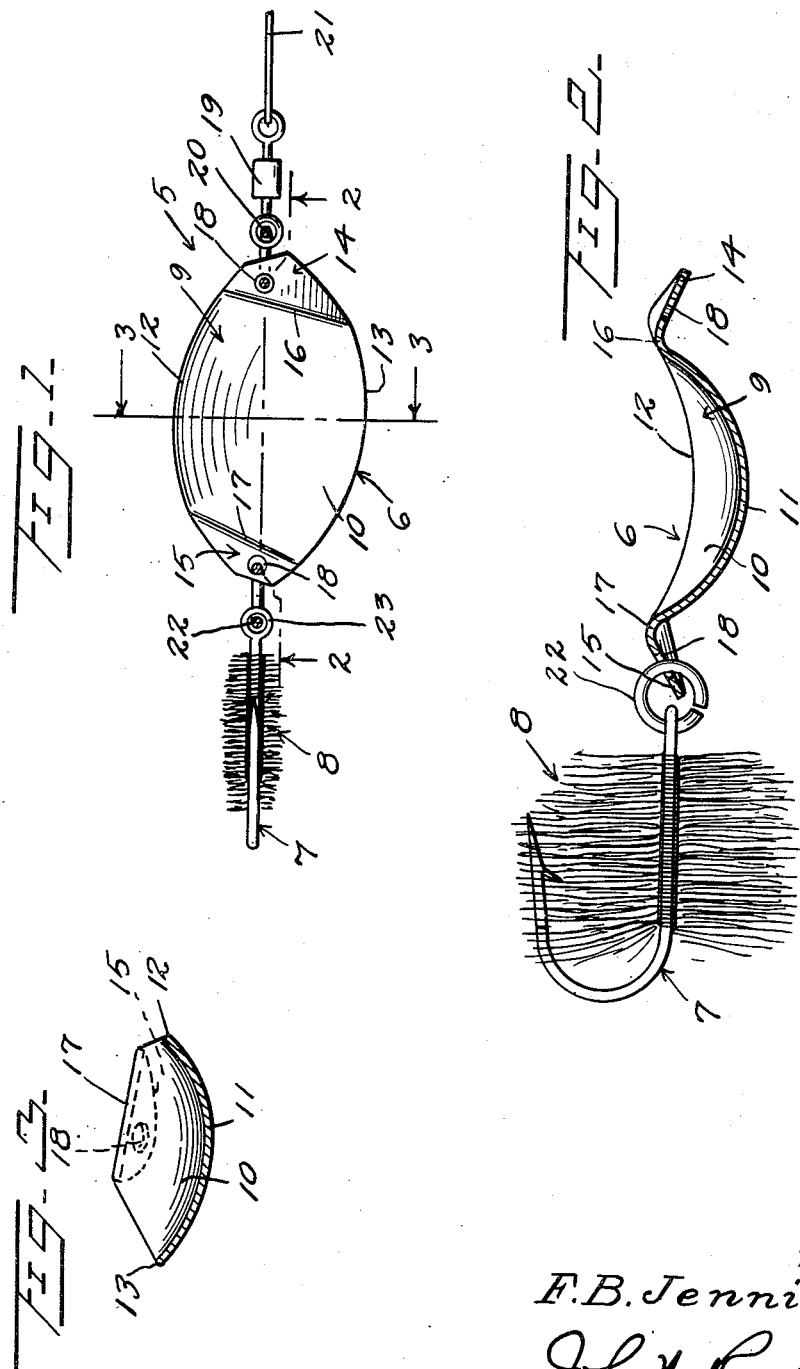
INVENTOR
F. B. Jennings
BY John N. Randolph
ATTORNEY

2,783,577

FISH LURE

Frank B. Jennings, Olympia, Wash.

Application December 7, 1955, Serial No. 551,637

3 Claims. (Cl. 43—42.5)

This invention relates to a novel fish lure and more particularly to a spoon-type lure primarily adapted for use in trolling, especially for salmon.

More particularly, it is an aim of the present invention to provide a fish lure of the spoon-type which, due to its unique construction and shape will execute an unusual "swimming" movement when trolled through the water, including a sidewise darting movement to substantial angles relative to the dircetion of pull on the lure, in combination with darting up and down movements.

A further object of the invention is to provide a spoon-type trolling lure having a concave body portion dished to a substantial extent to prevent rotation of the spoon about the longitudinal axis of the lure while being trolled or drawn through the water.

Still another object of the invention is to provide a spoon-type lure having end portions inclined in a plurality of directions from the concave body portion of the spoon, disposed between said end portions, by means of which the lure body is thrown off balance by impingement of the water thereagainst, as the lure is drawn through the water to cause the lure to travel in an irregular course which very realistically simulates the irregular swimming movement of a wounded natural bait fish.

Various other objects and advantages of the invention will hereinafter become more fully apparent from the following description of the drawing, illustrating a presently preferred embodiment thereof, and wherein:

Figure 1 is a top plan view of the fish lure;

Figure 2 is a longitudinal sectional view thereof taken substantially along a plane as indicated by the line 2—2 of Figure 1 and on a somewhat enlarged scale, and Figure 3 is a cross sectional view, taken substantially along a plane as indicated by the line 3—3 of Figure 1, and on a somewhat enlarged scale.

Referring more specifically to the drawing, the fish lure in its entirety is designated generally 5 and includes a spoon-type lure body, designated generally 6, and a fishhook 7 the shank of which is attached to hackle and/or a bucktail, designated generally 8.

The lure body or spoon 6 has an elongated relatively wide intermediate portion 9 which is dished to a substantial extent, as seen in Figure 2, to provide a concave upper side 10 and a convex underside 11. The longitudinal side edges 12 and 13 of the intermediate dished portion 9 are convexly bowed as seen in top plan in Figure 1 and are downwardly bowed as seen in side elevation.

The lure body or spoon 6 also includes end portions or lips 14 and 15 of substantially the same shape, which lips are inclined outwardly and downwardly from end portions 16 and 17 of the intermediate portion 9 of which said lips 14 and 15, respectively, form extensions. As seen in Figure 1, said end portions 16 and 17 are disposed substantially parallel to one another and at angles of less than 90° to the longitudinal axis of the lure. Thus, the portions 16 and 17 define bent edge portions of the lure body 6, as best illustrated in Figure 2, and the parts of the intermediate portion 9 disposed adjacent thereto slope downwardly and inwardly therefrom, whereas the lips 14 and 15 slope downwardly and outwardly from said bent edge portions 16 and 17. The lips 14 and 15 in addition to being inclined downwardly and outwardly from said diagonal bent edges 16 and 17 also slope transversely of the body 6 and in opposite directions, as seen in Figures 2 and 3. Accordingly, the lip 14 slopes transversely from its high end which merges with the longitudinal edge 12 to its low end which merges with the longitudinal edge 13, while the other lip 15 slopes transversely from its high end which merges with the edge 13 to its low end which merges with the edges 12, as clearly illustrated in Figure 3. Accordingly, said diagonal bent edges 17 likewise slope from end to end thereof in directions corresponding to the lips 14 and 15, respectively. The lips 14 and 15 are provided with openings 18 located adjacent the high ends thereof and which are disposed substantially in alignment with the longitudinal axis of the body 6, as seen in Figure 1.

One end of a conventional swivel 19 is attached by a ring 20 to the lip 14 by means of the opening 18 thereof. A fishing line or leader 21 is attached to and leads from the other end of the swivel 19. A ring 22 engages the opening 18 of the lip 15 and the eye 23 of the shank end of the fishhook 7 for connecting said fishhook through the ring 22 to the lip 15, which constitutes the trailing end of the lure body 6.

As the lure 5 is drawn through the water, while being trolled, from left to right as seen in Figure 1, it will be maintained against rotation about its longitudinal axis due to the fact that a substantial portion of the intermediate part 9 of the lure body or spoon 6 is offset downwardly below the level of the opening 18 of the lip 14, the point at which the forward pull is exerted on said lure body 6. As the lure travels from left to right of Figure 1, the water impinging against the upper and forward side of the front or leading lip 14 will cause the forward end of the lure body 6 to be deflected downwardly and as said lip slopes laterally in a downward direction from left to right, looking from the rear toward the front of the lure body 6, the water impinging against the upper side of the lip 14 will tend to cause the forward end of the lure body 6 to be deflected toward the left with respect to the direction of travel thereof. Also, as seen in Figure 2, a substantial part of the forward half of the underside 11 is disposed below the level of the lip 14 and the water impinging thereagainst will tend to cause the rear part of the lure body 6 to be rocked upwardly. At the same time, water deflected upwardly by contact with the upper surface of the forward lip 14 will flow over the bent edge 16 and longitudinally along the dished concave upper surface 10 toward said diagonal rear edge 17. Pressure will be developed by this water passing longitudinally of the upper dished surface 10 as it becomes confined in approaching the edge 17, and this water will be deflected by the upwardly sloping rear half of the surface 10 toward the high point of the rear end of the body portion 9, where the bent edge 17 merges with the longitudinal edge 13, as seen in Figure 3. The pressure of the water impinging against the portion of the top surface 10, located adjacent the point where the edges 13 and 17 merge, will tend to deflect this rear corner of the lure body downwardly to a greater extent than the other rear corner of the lure body is deflected downwardly. Thus, the water pressures against the different surface portions of the lure body 6, as previously described, will cause said lure body to dart to the left and right, up and down, and to simultaneously execute a wobbling motion, all of which actions very realistically simulate the swimming movement of a wounded bait fish, so that the lure 5 will effectively attract game fish. Additionally, water passing over the rear edge 17 and along the rear lip 15 will produce a wake behind the lure body to agitate the hackle and bucktail means 8 of the hook 7 and which will additionally tend to attract game fish.

The lure 5 may be made in various sizes and the relative sizes of the lure body 6 and hook 7 may be varied. The hackle and bucktail means 8 may be of any desired color and the lure 5 may be utilized without the hackle and bucktail means 8. The lure body 6 may be of any desired color or may be provided with any suitable surface ornamentation.

Various other modifications and changes are contemplated and may obviously be resorted to, without departing from the spirit or scope of the invention as hereinafter defined by the appended claims.

I claim as my invention:

1. In a fishing lure of the character described, an elongated spoon-type lure body having an elongated dished intermediate portion provided with a convex underside and a concave upper surface, said lure body having a downwardly and forwardly inclined lip extending from and forming an extension of the forward end of said intermediate portion, said lip having an upper back edge disposed diagonally of the longitudinal axis of the lure body and substantially parallel to the longitudinal axis of said lip, said lip, including the back edge thereof, sloping transversely of the lip and substantially transversely of the lure body, and said lure body having a downwardly and rearwardly inclined lip forming an extension of the opposite, trailing end of said intermediate portion, said last mentioned trailing lip substantially corresponding to the first mentioned forward lip and including an upper front edge disposed diagonally of the longitudinal axis of the lure body, said trailing lip and the front edge thereof being inclined laterally of the lure body and longitudinally of said trailing lip in the opposite direction to the forward lip whereby diagonally opposite corners disposed at the upper ends of said front and back edges constitute high points of the lure body, said high point at the trailing end of said intermediate portion being disposed directly behind the lower end of the forward lip to be engaged and deflected downwardly by water passing along the upper side of said intermediate portion.

2. In a fishing lure as in claim 1, attaching means connected to the forward lip for connecting a fishing line or leader to the lure body, and attaching means connected to said trailing lip for connecting a fishhook to the lure body, said attaching means of the forward and trailing lips being disposed adjacent the upper ends of said lips and substantially in alignment with the longitudinal axis of the lure body and on opposite sides of which axis said high points are disposed.

3. In a fishing lure as in claim 1, said front and back edges being disposed substantially parallel to one another.

References Cited in the file of this patent

UNITED STATES PATENTS

| | | |
|---|---|---|
| 2,053,954 | Marsh | Sept. 8, 1936 |
| 2,527,064 | Hufnagel | Oct. 24, 1950 |
| 2,588,720 | Heiland | Mar. 11, 1952 |
| 2,596,959 | Roes | May 13, 1952 |